United States Patent [19]
Morsi et al.

[11] Patent Number: 5,794,030
[45] Date of Patent: Aug. 11, 1998

[54] SYSTEM AND METHOD FOR MAINTENANCE AND DEFERRED PROPAGATION OF SCHEMA CHANGES TO THE AFFECTED OBJECTS IN AN OBJECT ORIENTED DATABASE

[75] Inventors: Magdi Morsi, San Jose; James Rucker, Palo Alto, both of Calif.

[73] Assignee: Objectivity, Inc., Mountain View, Calif.

[21] Appl. No.: 567,119

[22] Filed: Dec. 4, 1995

[51] Int. Cl.$^6$ .................................................. G06F 17/30
[52] U.S. Cl. .......................... 395/614; 395/611; 395/616
[58] Field of Search .................................. 395/614, 612, 395/613, 615, 129, 700, 650, 611, 616

[56] References Cited

U.S. PATENT DOCUMENTS

| | | | |
|---|---|---|---|
| 4,558,413 | 12/1985 | Schmidt et al. | 364/300 |
| 5,241,624 | 8/1993 | Torres | 395/129 |
| 5,291,593 | 3/1994 | Abraham et al. | 395/600 |
| 5,339,438 | 8/1994 | Conner et al. | 395/700 |
| 5,361,350 | 11/1994 | Conner et al. | 395/614 |
| 5,392,432 | 2/1995 | Engelstad et al. | 395/700 |
| 5,423,038 | 6/1995 | Davis | 395/650 |
| 5,437,025 | 7/1995 | Bale et al. | 395/600 |
| 5,437,027 | 7/1995 | Bannon et al. | 395/600 |
| 5,511,188 | 4/1996 | Passucci et al. | 395/600 |
| 5,606,661 | 2/1997 | Wear et al. | 395/183.14 |
| 5,652,884 | 7/1997 | Palevich | 395/651 |
| 5,652,888 | 7/1997 | Burgess | 395/683 |

OTHER PUBLICATIONS

Clamen, Stewart M., "Data Persistence in Programming Languages", School of Computer Science, Carnegie Mellon University, Technical Report CMU-CS-91-155, May 30, 1991, pp. 2-66.

Morsi, Magdi M.A., Navathe, Shamkant B. and Kim, Hyoung-Joo, "A Schema Management and Prototyping Interface for an Object-Oriented Database Environment", Object Oriented Approach in Information Systems, pp. 157-179.

Lerner, Barbara Staudt and Habermann, A. Nico, "Beyond Schema Evolution to Database Reorganization", ECOOP/OOPSLA '90 Proceedings, Oct. 21-25, 1990, pp. 67-76.

Penney, D. Jason and Stein, J., "Class Modification in the GemStone Object-Oriented DBMS", OOPSLA '87 Proceedings, Oct. 4-8, 1987, pp. 111-117.

Banerjee, Jay, Kim, Won, Kim, Hyoung-Joo and Korth, Henry F. "Semantics and Implementation of Schema Evolution in Object-Oriented Databases", ACM SIGMOD '87 Proceedings, May 1987, pp. 311-322.

*Primary Examiner*—Thomas G. Black
*Assistant Examiner*—Frantz Coby
*Attorney, Agent, or Firm*—Fenwick & West LLP

[57] ABSTRACT

A method and system for use with object oriented databases provides schema evolution with deferred propagation of schema changes. The method and system provide a schema that persistently maintains class objects by storing an initial class definition, and shape objects associated with particular class objects and storing subsequent class definitions. The shape objects associated with a particular class object form a shape chain, the last shape object in the shape chain being the current shape object, and maintaining the current class definition. Client objects representing actual instances of data in the database, are instantiated from whichever client object or shape object is current at the time of instantiation, so the all newly created client objects always have the current class definition. Existing client objects, which are those that were created prior to one or more subsequent modifications of the class definition and instantiations of the shape objects in the shape chain of the class, are updated to the current class definition only when they are accessed in the database, thereby providing deferred propagation. Updating such client objects includes copying data members for which there was no change in the definition of the member, and performing type conversion on those data members for which there was a change in the definition of the member.

22 Claims, 12 Drawing Sheets

5,794,030

SYSTEM AND METHOD FOR MAINTENANCE AND DEFERRED PROPAGATION OF SCHEMA CHANGES TO THE AFFECTED OBJECTS IN AN OBJECT ORIENTED DATABASE

BACKGROUND

1. Field of the Invention

This invention relates generally to the field of database management systems, and more particularly to systems and methods for managing schema evolution in object oriented database management systems using deferred propagation of schema changes.

2. Description of the Related Art

Object-oriented databases use objects to persistently store and manipulate information. The database retains information describing the structure and type of data stored in each object in a database schema. The schema defines for each class of objects the data members and their properties and methods that an object of a particular class will have once instantiated. The database schema includes the description of each class. This description typically includes the class name, and for each member of the class, an access control (public, private, or protected), type (reference, association, primitive, embedded), and domain type (primitive or user defined class). Also, additional physical information is typically maintained for associations; such as lock propagation, delete propagation, and the effect of copying or versioning an object on associations. The schema further includes information regarding whether or not a class has an internal virtual table pointer.

The schema of all objects of a class is the same. In order to avoid replicating the schema information per object, the schema of each class is stored separately from the actual objects. In addition, the class of each stored object is maintained in a separate part of the database under the system control.

The database schema is used by database management systems to allocate space for an object by computing the memory needed to store an object when an object is instantiated, as well as support physical layout requirements of different hardware architectures, such as the representation of the floating point number, and alignment of different built-in types. This enables the database management software to change the physical layout of the objects to match the current hardware whenever it is different from the one used to create the object. The schema information is also used to support query and indexing capabilities in Database Management Systems.

As in object oriented programming languages, object oriented databases support class inheritance. Class inheritance enables users to define new classes which are derived from existing ones, called base classes. The derived class inherits all the properties of its base class. That is, a derived class will have additional properties, called locally defined, to those inherited from its base class. Classes from which no other classes are derived are leaf classes. In addition to inheritance, classes may be embedded in each other by defining the member of one class to be an object of another class.

Conventionally, there are two methods used to represent the database schema information, flat and non-flat representation. In a flat representation of the schema, the schema of a derived class includes the locally defined properties as well as the inherited properties from its base classes. That is, the flat representation itself includes all of the information necessary to define the derived class. A non-flat representation of the schema of a derived class includes only locally defined properties and a reference to its base classes. That is, the inherited properties are not replicated in the derived classes, and the base class information must be available to instantiate an object of the derived class. This distinction between flat and non flat representation applies to embedded classes also.

Over time, the owner or user of an object oriented database will typically desire to change the class definition of one or more of the database objects. This change in the class definition is done by altering the database schema, hence the concept of schema evolution. The schema evolution capabilities of a desirable database enable the users to change the database schema by adding, dropping, and/or modifying the properties associated with any class in the database. These changes should be applicable to base classes and leaf classes, as well as embedded and embedding classes.

In many object oriented programs, the objects of the program are created anew at run time, and are not stored persistently. The applications developer can thereby change the class definitions without effecting the execution of the application, since the new class definition will be used to create new objects, and there is no need to process existing objects. However, because an object oriented database persistently maintains its objects, any change to the schema of an object must be propagated to existing objects of the modified class so that the properties of the object match the current class definition.

Persistent objects may be updated either immediately with the changes in the schema, or at deferred point in time. Immediate updating typically requires updating all relevant objects in a single transaction, and is not often desirable because it requires accessing each object of the modified class and changing the appropriate information for the object. This is an intensive operation, and may require that the entire database management system be brought down out of regular use in order to update the objects. The loss of use may cause substantial inconvenience for the users of the database, as is typically the case in databases used in online transaction processing installations.

A deferred update mechanism postpones the updating process until some later point in time, whether the next time the database management system is executed, or the next time an object of a modified class is accessed, or the like. In order to minimize the disruption to the use of the database, it is desirable to use a deferred updating mechanism that only changes an affected object when it is accessed during a transaction. Deferred propagation of schema changes reduces the number of objects converted at one time and does not require bringing the database offline to convert the affected objects. This type of deferred updating of schema changes is thus generally more desirable in large databases that must be available continuously.

A deferred update mechanism must maintain some information for converting objects from an old schema of a class to the most recent one. This information will typically identify which version of a class is to be used to define an object in the database. This information can either be kept with the object or in a separate auxiliary data structure. This information will grow in proportion to the number of schema changes to a class. As a result of keeping track of such information, the opening of the database may take longer because this information is loaded at runtime. Thus, it is desirable to provide a representation of schema changes that efficiently represents the schema changes and current versions of database objects.

It is desirable to provide in an object oriented database the ability to change the schema of any class, whether a base class, leaf class, embedding class, or embedded class. However, because of both the amount of information needed to manage the schema evolution process, and the complexity of updating the appropriate objects in an efficient manner, conventional database management systems impose limitations on the schema evolution process that prevent this full range of schema evolution. Some conventional database management systems limit the number of pending schema changes that the user may make at one time. Other conventional database management systems may limit schema changes only to leaf classes, preventing the user from changing the schema of base classes, or intermediate classes. Still other databases may not support schema changes to embedded classes. Finally, some conventional database management systems may limit schema evolution to modification of a property of a class member or to classes which have no persistent objects.

Accordingly, it is desirable to provide a database management system that supports complete schema evolution of all class properties, without requiring the underlying database to be brought offline during propagation of the schema changes to database objects.

SUMMARY OF THE INVENTION

The present invention includes a schema maintenance architecture for a schema of database objects, and methods and systems for maintaining and evolving the schema by updating schema objects in the schema, and providing deferred propagation of schema changes to existing objects in the data. The schema maintenance architecture is provided by a schema of class objects and shape objects. These objects store the class definitions for client objects in an object oriented database. The class object for each class provides the initial class definition, and is used in the first instance, prior to any modifications, to instantiate new clients objects. Associated with each class object is a shape chain comprising an ordered set of linked shape objects. Each shape object stores a revised, or evolved, class definition of the original class object. The last shape object in the shape chain stores the most recent class definition.

Class objects are related to each other as base and derived classes, associated classes, embedded/embedding classes, and referenced classes. Correspondingly, the individual shape objects in the shape chain of each class share in these relationships with other shape objects of the appropriate classes.

When a new instance of a client object is created in the database, it is derived from the class definition provided by the last shape object in the shape chain for the particular class being instantiated. When an existing client object is accessed, it is checked whether it references the most recent shape object, and if not, then it is updated, by creating an instance using the most recent shape object, and transferring or converting the data members of the original object to the appropriate members of the new shape object instance.

The schema maintenance hierarchy provides operations to evolve existing class definitions. The evolved class definitions are parsed and checked for consistency with existing definitions, and then new shape objects are added to the set of classes having consistent class evolutions. This allows the database system to preserve the schema changes independently of the definitions of individual clients objects, and allows the propagation of the schema changes to be deferred until a particular client object of an evolved class is accessed.

Client objects are then updated at access time by comparing the shape objects with which they are associated with the most current shape object in a client object's class domain. If the shape associated with a client object is not the most recent, then an instance of the shape is created, and the data members of the client object are copied or converted over to the shape object instance, and the new instance is written back to memory to replace the old client object.

DETAILED DESCRIPTION OF THE INVENTION

Figure 1:
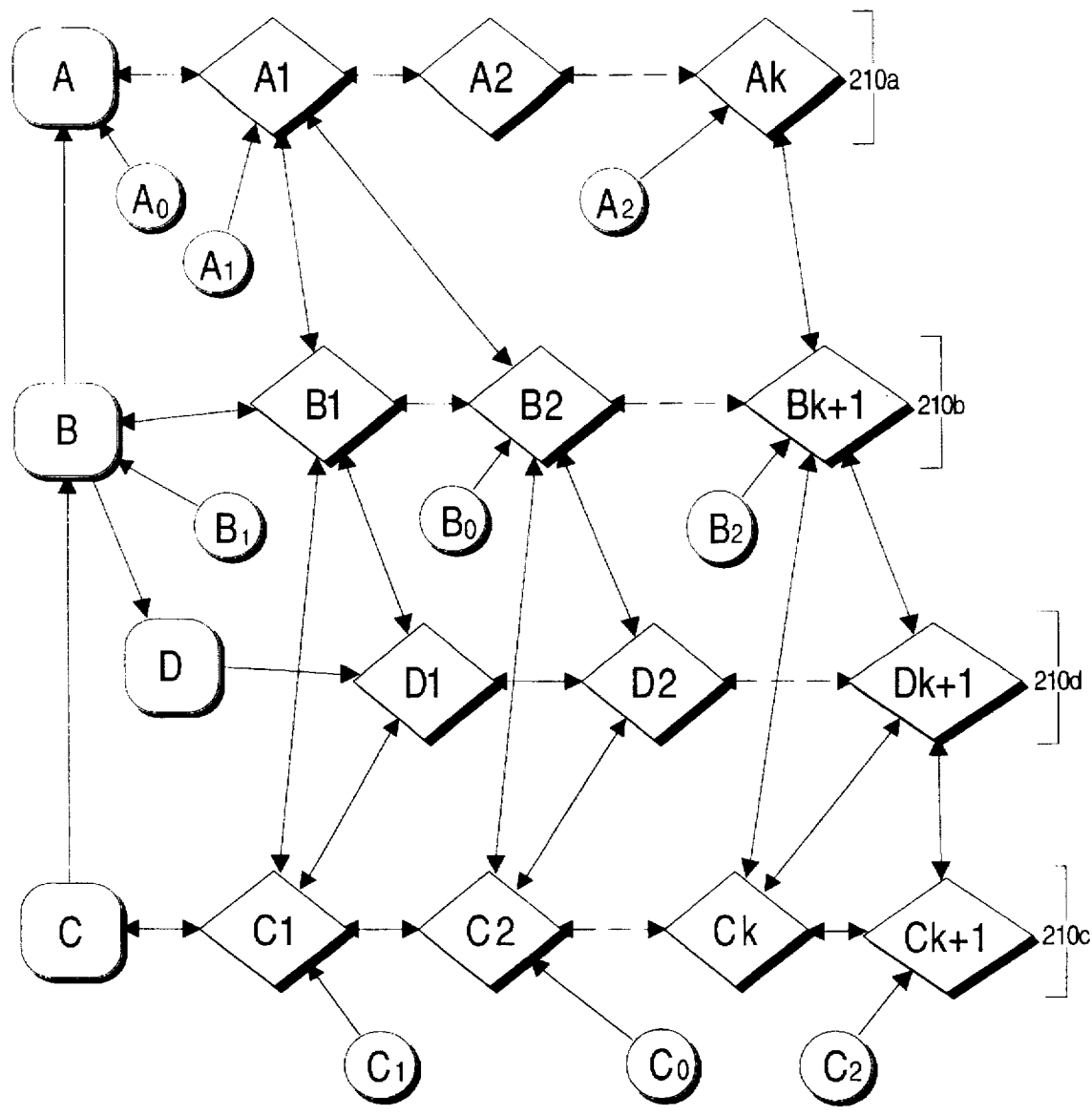
FIG. 1 is an illustration of a schema consistent with the present invention.

Referring now to FIG. 1, there is shown an abstract embodiment of a schema in an object oriented database operating in accordance with the present invention. In FIG. 1, there is shown an arrangement of schema objects including class objects 100 and shape objects 200. Each class object 100 represents an underlying class in the object oriented database. The class object 100 stores data defining client objects 230 instantiated from the class into the object oriented database, according to an initial class definition. The class objects 100 are related to form an inheritance network. In FIG. 1, a simple inheritance network with class objects A, B, C and D is shown. Class A is a base class from which derives class B. Class C inherits from class B. Class D is the type of one of the members of class B, and is embedded therein.

Each class object 100 is associated with a shape chain 210, the shape chain comprising an ordered, associated set of shape objects 200. A shape object 200 (or simply shape) stores a particular instance of the schema or class definition for the class object 100 that heads the shape chain 200, the class domain. In the shape chain 210, each shape 200 has reference to its predecessor shape 200 and its follower shape 200. These references define the sequences of changes to the schema of the class domain. The last shape in the shape chain 210 stores the most recently updated class definition for the class domain. Thus, for class A there is a shape chain 210a comprising shapes A1, A2 through Ak. Similarly, for class B, there is a shape chain 210b that include shapes B1, B2 through Bk+1. Classes C and D also have their respective shape chains 210c and 210d with shape objects. Shape Ak stores the most recently updated class definition of class A. Shape Bk+1 stores the most recently updated class definition of class B; similarly for classes C and D.

When client objects 230 are instantiated in the database from a class, they are created according to the schema definition preserved by the most recent shape 200 associated with their class domain. For example, in FIG. 1, client object $A_0$ was instantiated from the original schema of class A. Subsequently, the schema of class A was modified, resulting in the creation of shape A1. When a new instance of class A was needed, client object A1 was created, but from the schema preserved by shape A1.

Figure 9:
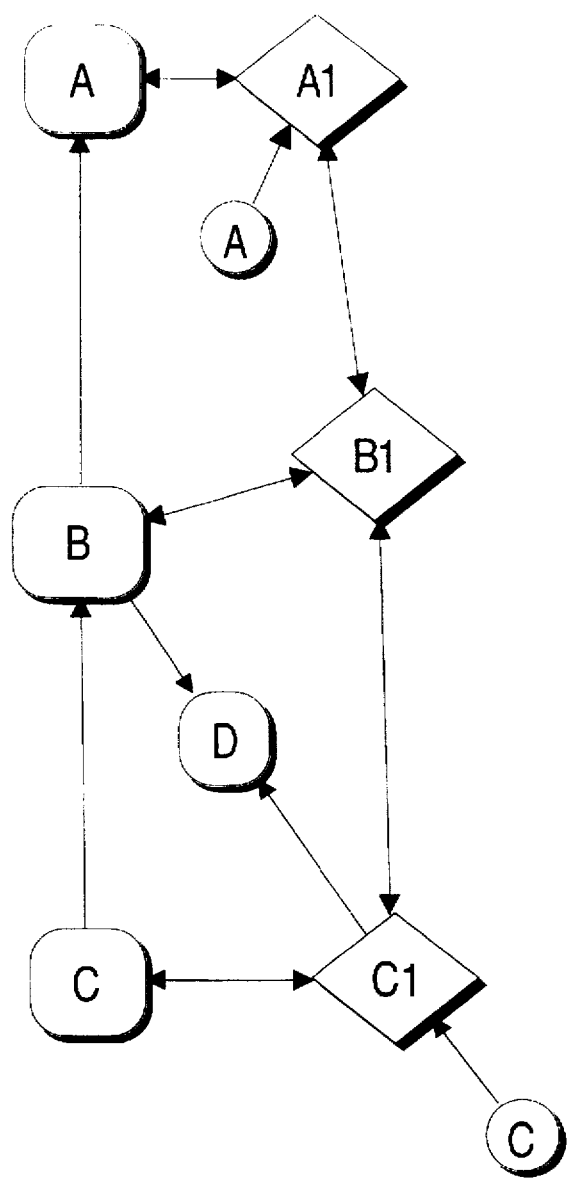
FIG. 9 is an illustration of the schema after a single update pass.

Since class B derives from class A, when a shape A1 is created, a new shape B1 is also created and references shape A1; similarly for shape C1. FIG. 9 illustrates the schema structure after a first update to the schema of class A following a change in the definition in the class definition of class A. A new shape object A1 is created, along with shape B1 and C1.

Subsequently, an object in class A was created according to the schema definition provided in shape A1. After additional modifications, the most current shape became shape Ak. When a new object of class A is created, it takes its definition from shape Ak. FIG. 1 illustrates various other relationships between instantiated objects and their defining shapes. Note that in FIG. 1, there has been no propagation of the schema changes to existing objects as of yet, only the illustration of new objects relative to the schema architecture.

Each shape 200 may have references to shapes 200 in distinct shape chains 210 associated with other class objects 100. These references correspond the relationships of the underlying classes themselves. For example, class B derives from class A, and so the shape B objects 200 refer to selected shape A objects 200. The reference is based on the most recent shape 200 in existence in the destination shape chain at the time the source shape 200 is created. For example, in FIG. 1, the schema of class B was modified and shape B1 was created to reflect the new schema definition of class B after the creation of shape A1, described above. Since class B derives from class A, all objects that are instantiated from class B must have the current definition of class available. Accordingly, when shape B1 was created, it referenced shape B as its parent shape (base class shape). In FIG. 1, class B was again modified subsequent to the first modification of class A, and a new shape, shape B2 was created. Since the most recent version of class A at that time was shape A1, shape B2 refers back to it.

Similarly, each shape object 200 has references to its parent shapes and the shapes of its derived classes (child shapes). Also, a shape 200 of an embedded class refers to the shapes 200 of the class object 100 that embeds it, and the embedding shape has reference to the shapes that it embeds. In FIG. 1, class D is an embedded as a member of class B. Thus each shape D1, D2, through Dk in the shape chain 210d of class D refers to the most current shape B in existence at the time the modifications to class D are made, and these shapes also refer to their embedded members. Class C in FIG. 1 was modified after the last modification to class B, thus has shape Ck+1 which refers back to shape Bk and shape Dk. Generally, a shape of a derived class or an embedded class always refers to a chronologically equal or younger shape.

Figure 2:
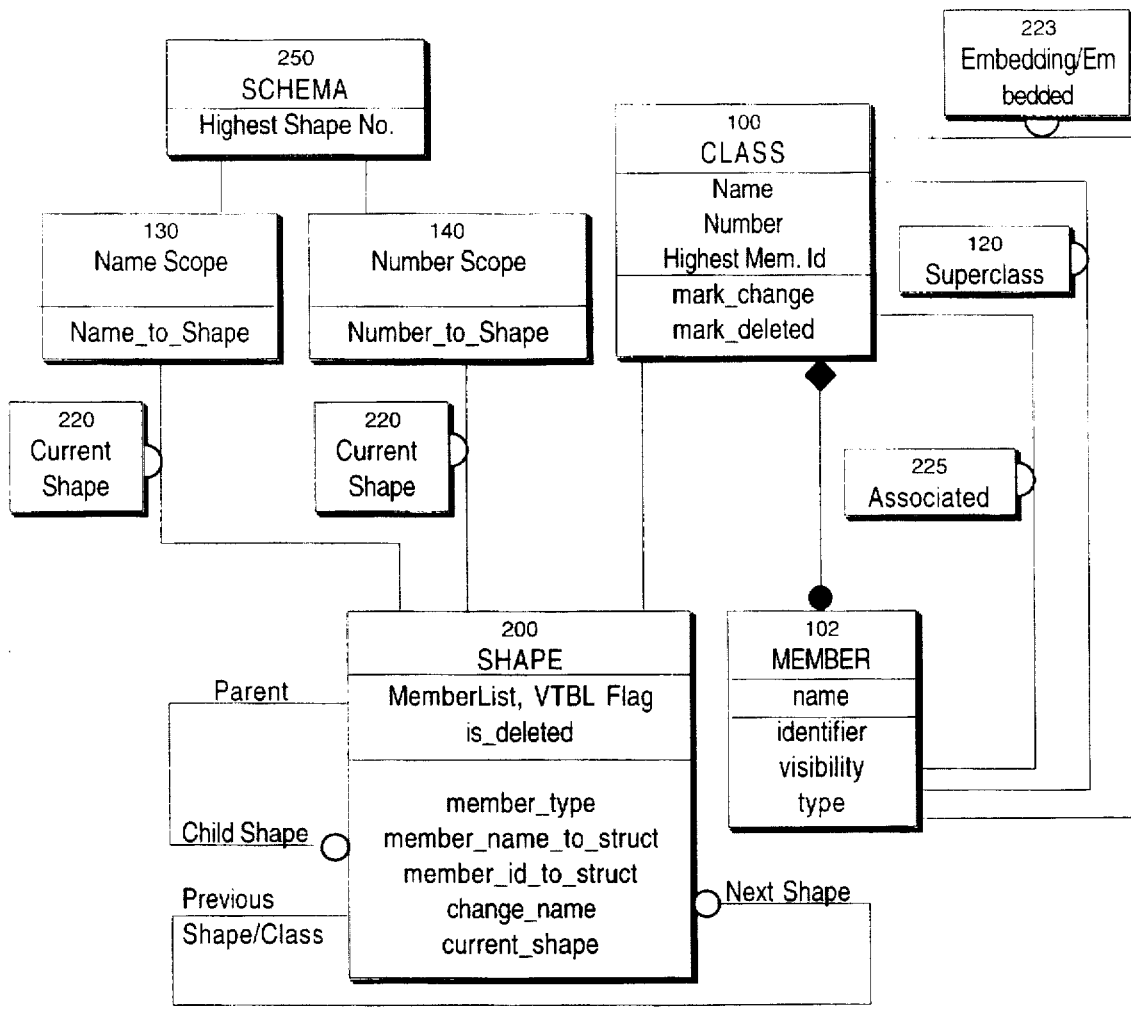
FIG. 2 is an object model of the objects used to support the schema maintenance architecture.

Referring now to FIG. 2, there is shown in more detail the structure of class objects 100; shape objects 200 have the same general structure as class objects 100, except as further described below. Each class object 100 has a unique class name and a unique class number which defines the type of the class. The shape 200 also stores the class name and class number of the class with which the shape 200 is associated. Each shape 200 has a shape name and a unique shape number.

Class objects 100 also provide two operations for evolving the schema. A mark_change function sets a flag indicating the shape 200 has been updated; no return value need be provided. A mark_deleted function sets a flag indicating that the class has been deleted. The objects of a deleted class are physically removed when the database is scanned in order to evolve objects (i.e. propagate schema changes) or when the database is searched for an object of a given type.

Each object that is instantiated from the original class will have the class number. This allows an object manager, further described below, to obtain the correct members for the object. When a class is updated, and a new shape 200 is created, each subsequently instantiated object from the class will have the shape number of the last shape 200 in the shape chain 210, rather than the class number of the class domain. Again, this allows the DDL processor to obtain the most current members of the class.

Each member of a class is represented by a member object 102 that defines the member of the class. Each member object 102 has a name, and a type. The name is the name used to define the member, so that it may be accessed by other objects. The type is any of conventional primitive types, such as string, integer, float, or complex types typically created by the application developers, such as various structs, arrays, other objects, and the like. In addition, a member object 102 may specify a type defined by another class, as either an embedded type or an association type. In the former case the class that defines the member is embedded in the class having the member, and the latter is the embedding class. Associations are used to relate objects in the object oriented database. The associations may be unidirectional or bidirectional. For example, an employee class object may be associated with a department class object. The association further defines the propagation properties to be applied to associated objects, including delete propagation, update propagation, and copy propagation. These propagation properties may be user definable. The association between classes stores a class identifier of the destination class in the class domain. Each class object 100 further stores references to its base classes, and to any classes that derive from it. Where a member object 102 has a class as its type, the member object 102 also has a reference to the shape object 200 for the class with the appropriate indication of the relationship.

Class inheritance is also handled with embedded members in both the class objects 100 and the shape objects 200. For superclasses, the class object 100 of the superclass is an embedded member of the class object 100 of the subclass. A flag 120 is maintained with the embedded class indicating that it is a superclass. This representation is consistent with C++ using non-flat representation, and simplifies integration of existing C++ libraries with the schema maintenance architecture of the present invention.

Each member object 102 has a locally unique identifier value, that is incremented for each new member of the class. The identifier is constant once assigned to a member object 102, even if the name of the underlying member is changed subsequently. A class object 100 itself stores the highest member identifier value 113. The member object 102 further defines a visibility 109 value specifying the access other objects have to the member 102.

A shape 200 references the same non-function members 102 as its class domain. In the preferred embodiment, a shape 200 does not store the definitions of function members, in order to economize storage needs. Rather, for function members, a shape 200 stores a pointer to the virtual function table location that references the function. This pointer is provided to new client objects 230 that are instantiated from the shape 200. As with the class objects 100, a shape 200 stores the highest member identifier of its members. As new members are added to the schema of the object, the shape 200 will also increment this member identifier. Each shape 200 further stores for a deleted flag for those members of the previous class definition that are deleted in the new class definition. The shape 200 stores a list of the members 102 in the class, and for each class, there is flag indicating whether a virtual table pointer is needed for the class. Each physical member of a shape 200 (embedded data member of a non-persistent capable class) maintains the shape number of its class domain.

The shape object 200 further provide a set of functions to facilitate the schema maintenance. A member_type function accepts a name of a member of a class, and returns the type of the member. A member_name_to_struct function accepts a name of a member and returns a struct representing the member. The struct includes all of the information stored by the member 102, including the member name, type, visibility, and the like. This allows other objects, or mechanisms to manipulate the definition of the member. Similarly, a member_id_to_struct function accepts an identifier value of a member and also return the member struct. A change_name function accepts as input a string for a new name of the class, and updates the class name to this string value. The class/shape number is maintained. Finally, a current_shape function accepts a class/shape number and returns a reference to the most recent, or current shape 200 of the class.

A globally available name scope object 130 provides a single method that returns a reference to the current shape 200 of a class 100 given a class name. Similarly, a globally available number scope object 140 provides a single method that returns reference to the current shape 200 of a class 100 given a class number. Each class object 100 uses the name scope object 130 or the number scope object 140 to obtain the shape number of the current shape 200 of the class 100.

The schema maintenance architecture of the present invention, thus, supports deferred propagation and schema evolution because both a current and previous schemas of each class are maintained in a compact form. Deferred propagation of schema changes is supported by waiting until an object in the database is accessed and then updating it to the schema maintained by the current shape of its class. Before describing in more detail the deferred propagation process, a system architecture supporting the schema architecture is described.

Figure 3:
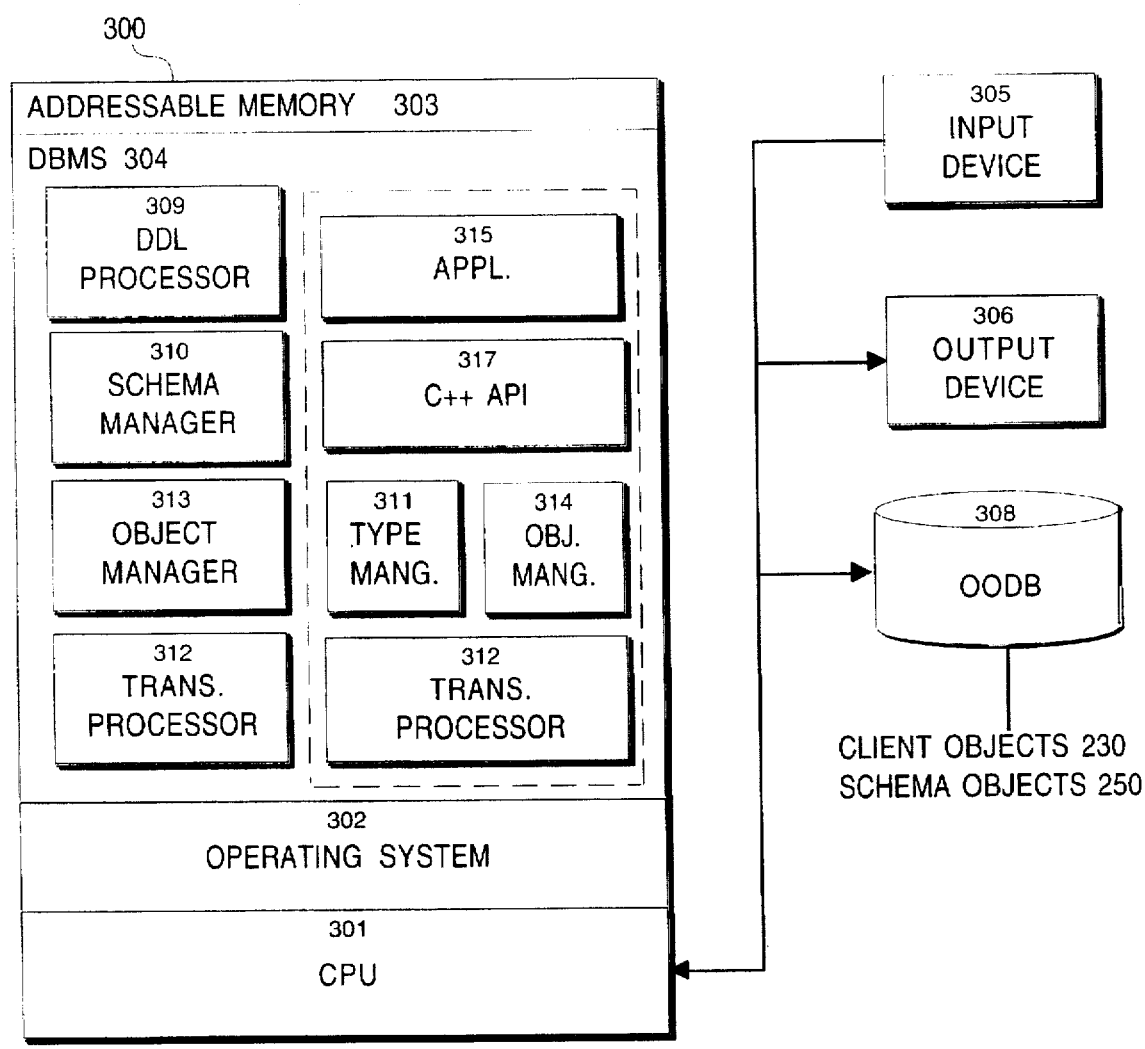
FIG. 3 is a block diagram of a system providing the schema maintenance architecture of the present invention for an object oriented database.

Referring now to FIG. 3, there is shown one embodiment of a system architecture providing the schema maintenance of the present invention. A preferred system includes a general purpose computer 300 such as a Sun Microsystems' SPARC station, having a conventional processor 301, addressable memory 303, input devices 305, and output devices 306. The addressable memory 303 includes a conventional operating system 302, such as UNIX®, or Microsoft Windows®, or the like. The addressable memory 303 further includes a database management system (DBMS) 304 structured in accordance with the present invention. A suitable DBMS 304 is Objectivity Inc.'s Objectivity/DB.

The DBMS 304 supports an object oriented database 308 (OODB) in conformity with the present invention. The operating system 302 provides conventional networking support, allowing other workstations 300 (not shown) to cooperate with the DBMS 304 and OODB 308 as either clients or servers. The OODB 308 maintains at least two distinct object types, namely client objects 230 and schema objects 250. Client objects 230 are the objects used to store actual data in the database 308. The client objects 230 are defined by the database developer as needed. Client objects 230 may be incorporated from object oriented class libraries, or may be created from scratch. Schema objects 250 are the class objects 100 and shape objects 200 used to store the class definitions and modifications, and have the attributes and methods described above.

In the development environment, the DBMS 304 further includes a data definition language processor 309 that provides the definition and manipulation of the schema definitions of the client objects 230. The DDL 309 generates code for setting the virtual table pointer, provides methods for supporting operations on associations and object references, and controls populating the schema information in the database. A schema manager 310 controls the actual schemas of client objects 230 through the schema objects 250. At runtime the DBMS 304 provides an executable application 315, including a C++ API 317, a type manager 311 that provides type support and type conversion, and an object manager 314. The object manager 314 handles requests for client objects 230 from the API 317, and passes these requests to the transaction processor 312, obtaining type information and conversion as necessary from the type manager 311.

Figure 4:
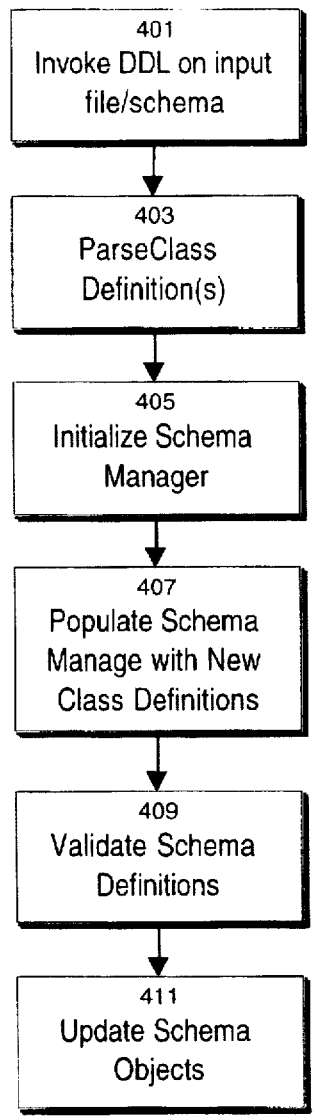
FIG. 4 is a flowchart of one embodiment of a process for evolving the schema.

Referring now to FIG. 4, there is shown the process of updating the schema in an object oriented database. The updating process begins with the user, such as the database developer, invoking 401 the DDL 309 of the DBMS 304 on a particular database file and schema file containing the schema of the OODB 308. The user indicates whether the input file is to be used to evolve the existing schema, or whether it is a schema of a new class. Using the preferred DBMS 304, the invocation generally takes the form of ddl -evolve file_name.ddl schema_name, with the evolve switch indicating to the DDL 309 that the schema arrangement is to be evolved, or updated, with the input file and schema. The DDL 309 sets a flag indicating whether the schema is being evolved and passes it to the schema manager 310.

Figure 5:
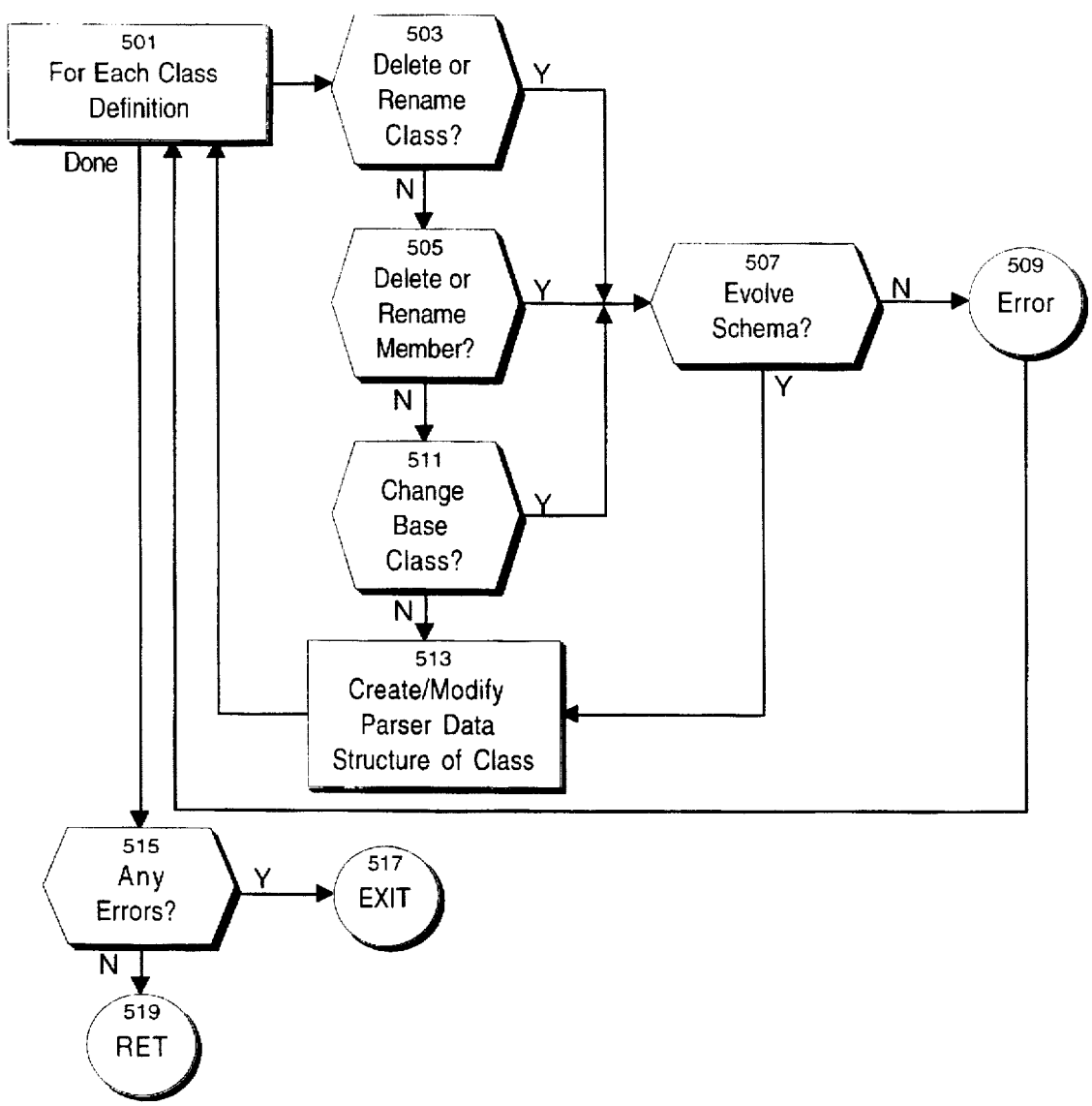
FIG. 5 is a flowchart of one embodiment of a process for parsing class definitions in a new schema definition for existing schema objects.

The DDL 309 parses 403 the class definitions in the input file to create a set of parser data structures with the desired class definitions, whether those are modifications of existing ones, for evolving existing schemas, or completely new classes. FIG. 5 illustrates the parsing process. Looping 501 over each class definition, the DDL 309 determines 503 whether the class is to be deleted or renamed. Renaming or deleting a class is a form of evolution, and so the DDL 309 determines 507 whether the schema is to be evolved, by checking the evolve flag. If the schema is not being evolved, then the DDL 309 sets 509 an error, and continues with the next class definition. If the schema is being evolved, then the DDL 309 creates 513 the appropriate data structure, with the new name, or with a flag indicating that the class is being deleted. The DDL 309 then continues with each of the members of the class.

The DDL 309 further determines 505 if any of the members are being renamed. If so, the DDL 309 checks 507 for schema evolution, and either sets 509 the appropriate errors, or creates 513 the appropriate data structure for the class definition.

Finally, the DDL 309 determines 511 whether there has been a change in the base class for the class being defined. Again, this requires that schema evolution be specified as before, with either an error being reported 509, or the data structure being modified or created 513, as needed.

The DDL 309 checks 515 whether any errors were reported during the parsing, and if so, exits 317, without completing the schema evolution. If there are any errors, the user reviews and corrects the input file, and reprocesses it. If no errors are reported, the DDL 309 continues 519.

Referring again to FIG. 4, the DDL 309 initializes 405 the schema manager 310 in order to update the schemas and validate them in the database. The DDL 309 then populates 407 the schema manager 310 with the new class definitions, using the internally created data structures. When completed, the schema manager 310 has a representation of each class in the input file stored in the addressable memory 303, and ready for instantiation as schema objects 250.

Figure 6:
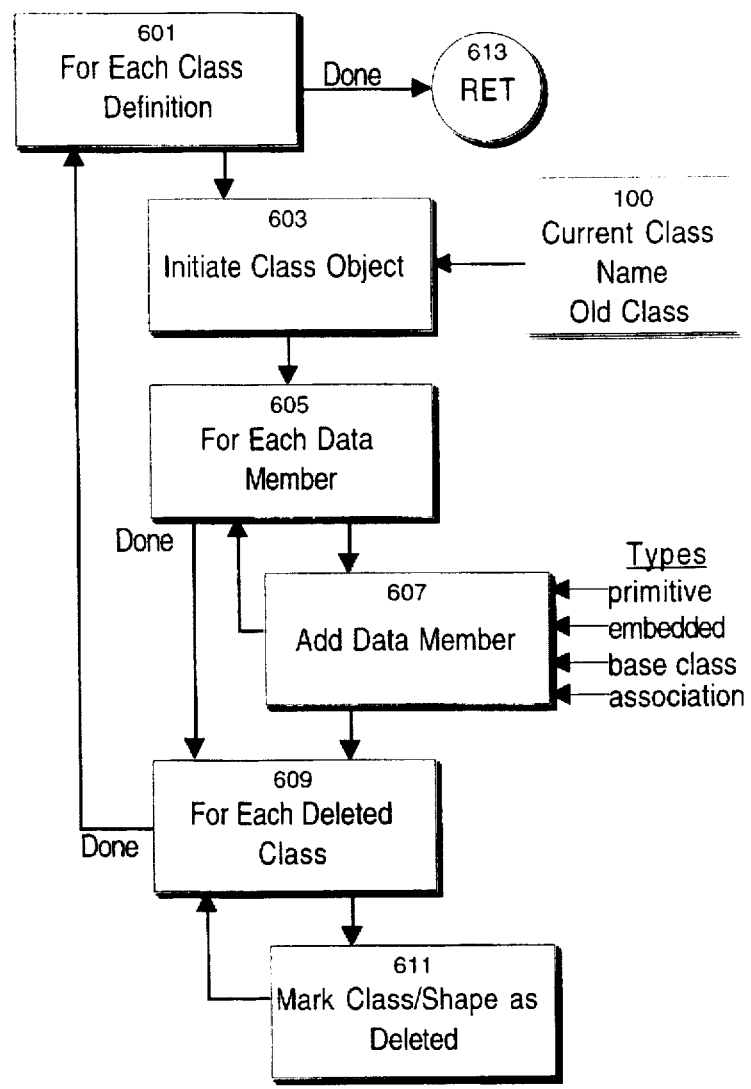
FIG. 6 is a flowchart of one embodiment of a process for populating a schema manager with the new class definitions of existing schema objects.

FIG. 6 illustrates the process of populating the schema manager 310, assuming that evolution is specified. The schema manager 310 loops 601 over each new class definition, and instantiates 603 a class object 100, accessing an existing class object 100 if one is present. The new class object 100 includes the new class name, the old class name, and a flag indicating whether or not the class has a virtual table pointer for functions included in the class.

The schema manager 310 then loops 605 over the data members in the new class definition. For each data member, the schema manager 310 adds 607 a member object 102 to the class object 100. The member created is one of the following types: primitive, embedded, base class, or association. For a primitive type, the schema manager creates the appropriate data representation from the class definition, including access control (public, private, protected), type, default value, current name, and old name. For an embedded data member, the schema manager 310 defines the member object 102 with its access control, domain class, current name, and old name. For a base class, the schema manager 310 defines the member object 102 with its access control, and previous base class, which is used to update the previous base class. For an association data member, the schema manager 310 defines the access control, domain class, propagation properties, and inverse member/class of the association. This process is repeated for each data member in the current class definition. When the class definition is completely traversed, the next class definition is processed 601.

For each class that is indicated by the user to be deleted from the schema, the schema manager 310 invokes the mark_deleted function of the class to mark the class as deleted. Deletion of objects of that class is deferred until the objects are accessed. When the marking is completed, the schema manager 310 returns 613. The schema manager 310 now has a complete representation of the input class.

Figure 7A:
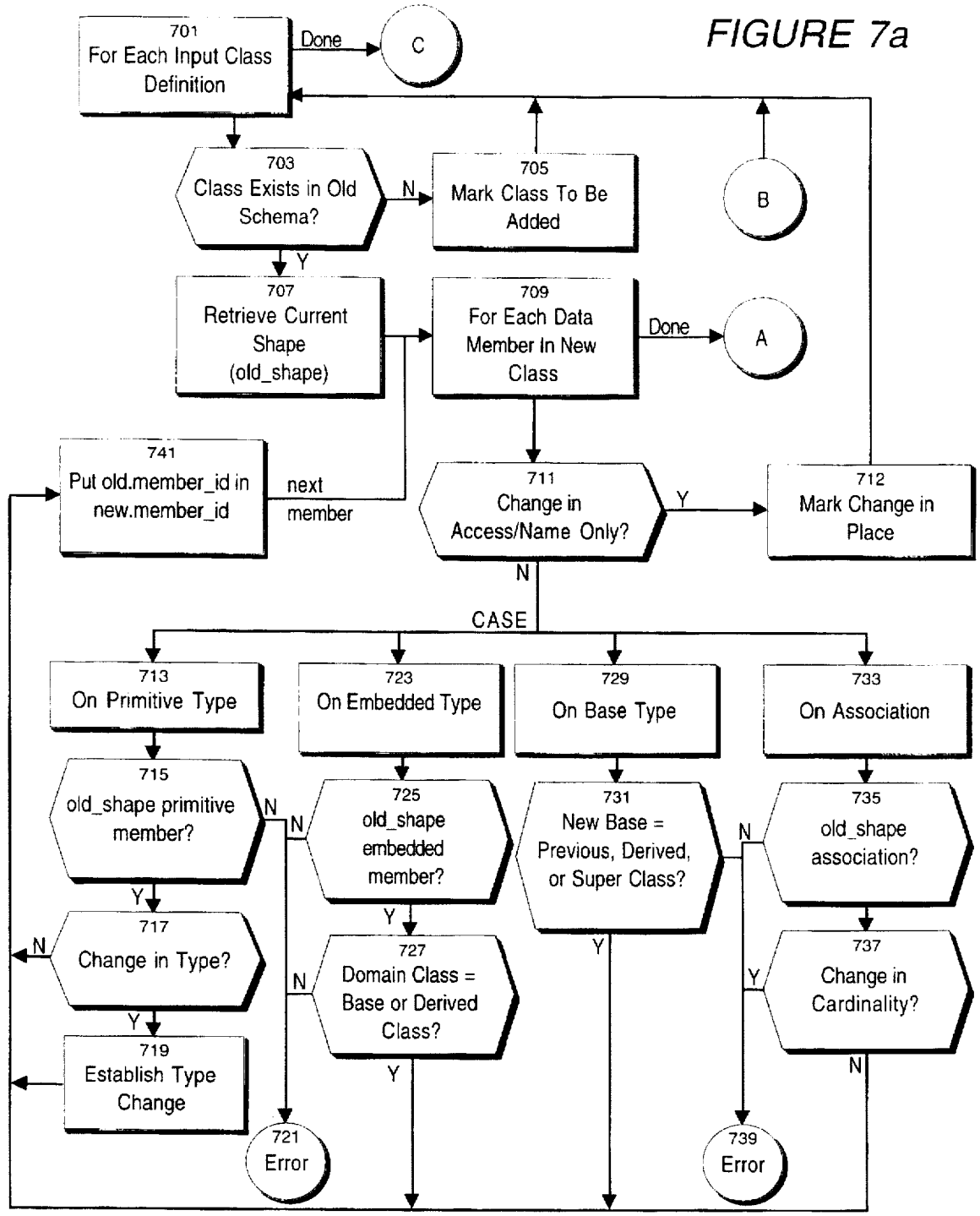
FIGS. 7a and 7b are flowcharts of one embodiment of a process for validating an updated schema.
Figure 7B:
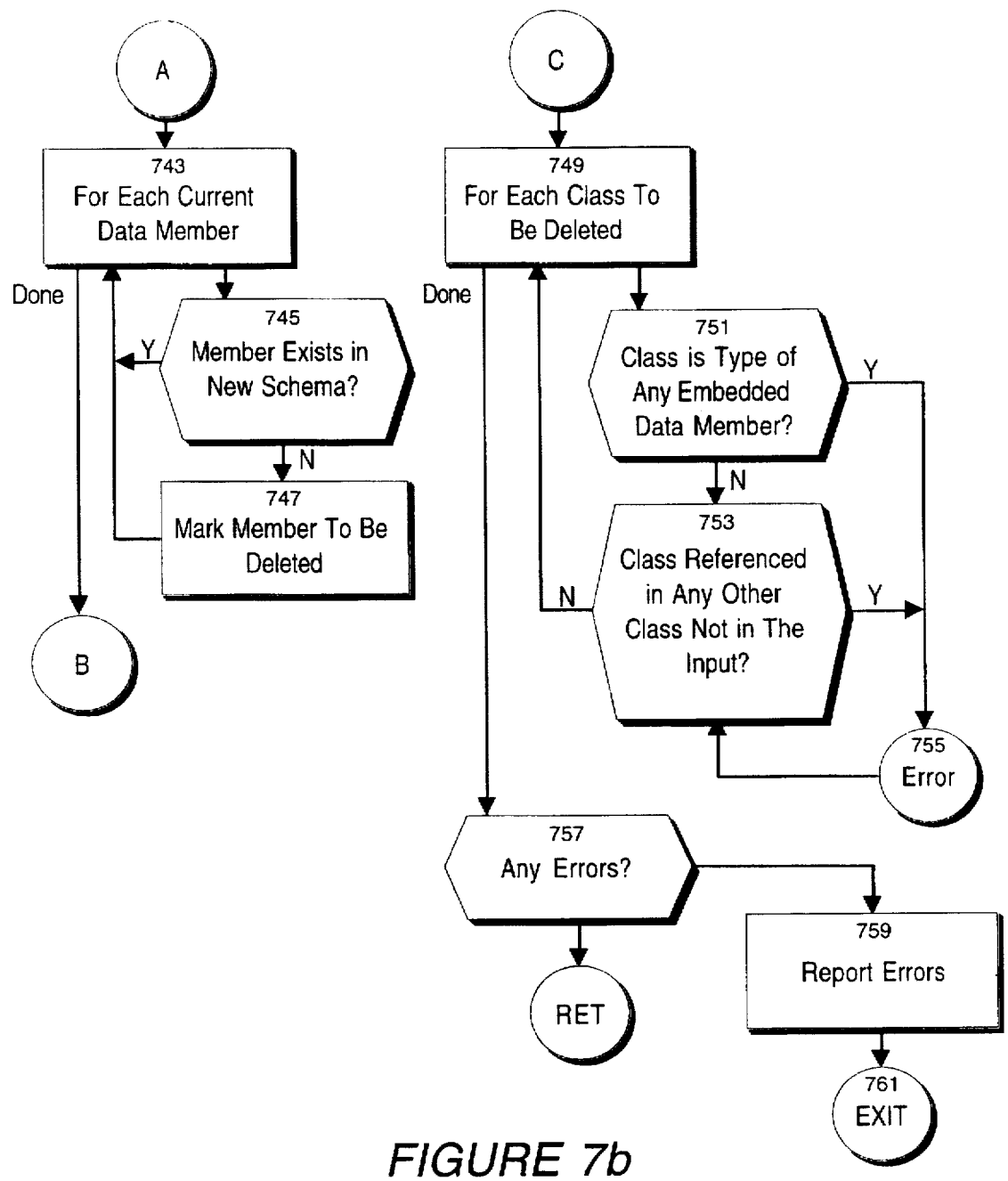

Referring again to FIG. 4, the schema manager 310 then validates 409 the schema definitions based on the input class definitions. FIGS. 7a and 7b illustrate the validation process. The validation process determines whether the schema requires new shape objects, or it can be evolved in place, with their current shape objects.

In FIG. 7a, the schema manager 310 traverses 701 each class input from the DDL 309, and determines 703 whether the input class is found in the existing schema. This determination is based on the class name. If the class does not exist in the schema, then it is marked 705 to be added to the schema, and the next class definition is accessed 701.

If the class exists in the schema, the schema manager 310 retrieves 707 the current shape object 200 from the schema. This is done using either the name scope object 130 or number scope object 140 and the appropriate input value, and each of these objects returns the current shape object 200 of the domain class. The schema manager 310 traverses 709 over the member objects 102 of current shape 200, and determines what changes, if any, were made to the member.

More particularly, the schema manager 310 determines 711 if there is only a change in the name or access control of the member object. If so, the schema manager 310 marks 712 the current shape 200 as changing in place, meaning that the definition of the current shape can be changed, without having to create a new shape object 200.

If there are other changes than access control or name, the schema manager 310 selectively checks these changes for consistency. If the member object 102 provides 713 a new definition of a primitive type, then the schema manager 310 confirms 715 that the old shape, the current shape 200, was also a primitive type. If not, there is an error 721, since the user is attempting to convert from a complex type to a primitive type. If the member object 102 is a primitive member, then it is checked 715 for a change in the type definition. If none is found, the schema manager 310 returns and updates 741 the identifier of the new member object 102 with the identifier of the old member object 102. Otherwise, if there is a change in the type, the schema manager 310 constructs 719 the appropriate type definition, and again updates 741 the member identifier.

For embedded types, base class types, and association types, the schema manager 310 performs equivalent consistency checks 725, 731, and 733. For embedded types, the schema manager 310 further checks 727 that the domain class for the new embedded type is either a base class or a derived class of the class object 100 of the current shape. For association types, the schema manager 310 checks 737 whether there has been a reduction in the cardinality of the association, and if so, responds with an error. While increases in cardinality are acceptable, there are no precise semantics for reducing cardinality. For base types, the schema manager 310 determines 731 whether the new base type is the same as the previous base type, a derived class of the previous base type, or a superclass of the previous base type. If not, there is an error 739, otherwise, the member identification is updated 741 as before.

Referring to FIG. 7b, once all of the new data members are checked, the schema manager 310 then reviews 743 each of the member objects 102 in the current shape, and determines 745 if a member is found in the new class definition. If not, the member object is marked 747 as to be deleted. Once all of the current data members are reviewed, the schema manager 310 then continues 701 with the next class definition, until all of these are checked. Once all of the new class definitions have been checked, the schema manager 310 loops 749 over the list of current classes to be deleted, based on the DDL input file. The schema manager 310 determines 751 whether a deleted class is used as the type of any embedded data member. If so, then the class cannot be deleted, since this would leave an undefined type of a member. Accordingly, the schema manager 310 marks 755 an error in this case. The schema manager 310 also determines 753 whether the class is referenced in any other class that is not in the input file. If so, there is again an incomplete definition of the reference, and an error is marked 755.

Once all of the validation checks have been made, the schema manager 310 tests 757 whether any errors were indicated, and if so, reports 759 these errors to the user, and exits 761. Otherwise, the schema manager 310 returns from the validation phase.

Figure 8:
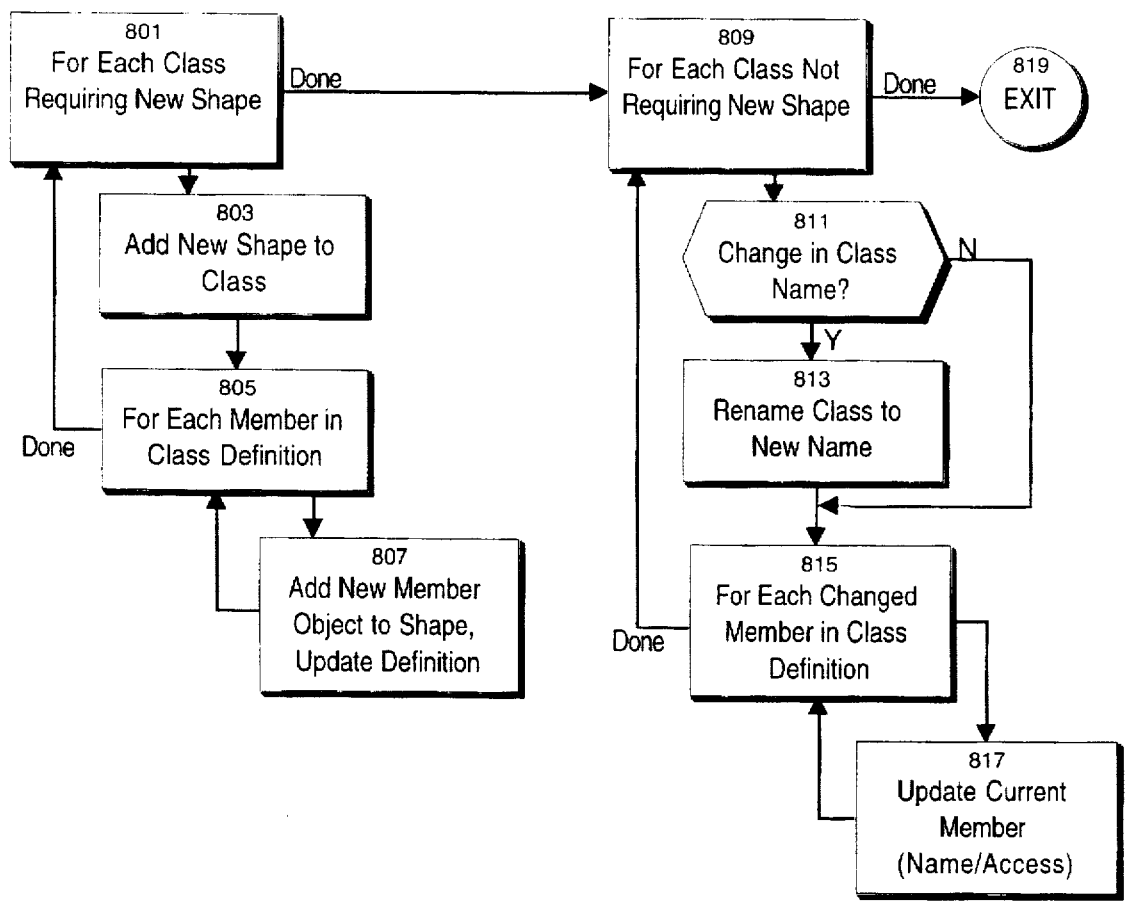
FIG. 8 is a flowchart of one embodiment of a process for updating the schema objects.

Referring again to FIG. 4, once the validation phase is complete, the schema manager 310 then updates 411 the schema objects 250 themselves. FIG. 8 illustrates the process of updating the schema objects. The schema manager 310 traverses 801 each of the classes requiring a new shape to be instantiated, as was marked 705 during validation. The schema manager 310 then adds 803 a new shape object 200 to the shape chain 210 for the domain class. For each member in the changed class definition (805) the schema manager 310 then adds 807 a new member object 102 to the shape object 200 definition, and updates the definition of the member object 102 with the new definition. New member objects 102 are given a increment member identification number.

Once all of the new shape objects 200 have been instantiated, the schema manager 310 then traverses 809 the list of classes that are marked for a change in place. If there is a change in the name of the class (811) the class is renamed 813 with the new name. The schema manager 310 then traverses 815 each changed member in the class definition, and updates 817 the current member with the changed name or access control of the member object 102.

Once the schema objects 250 have been updated, there remains the need to update existing client objects 230 to their new schema definitions. This requires converting each client object 230 at the time it is accessed (read/write) in the database 308.

Figure 10:
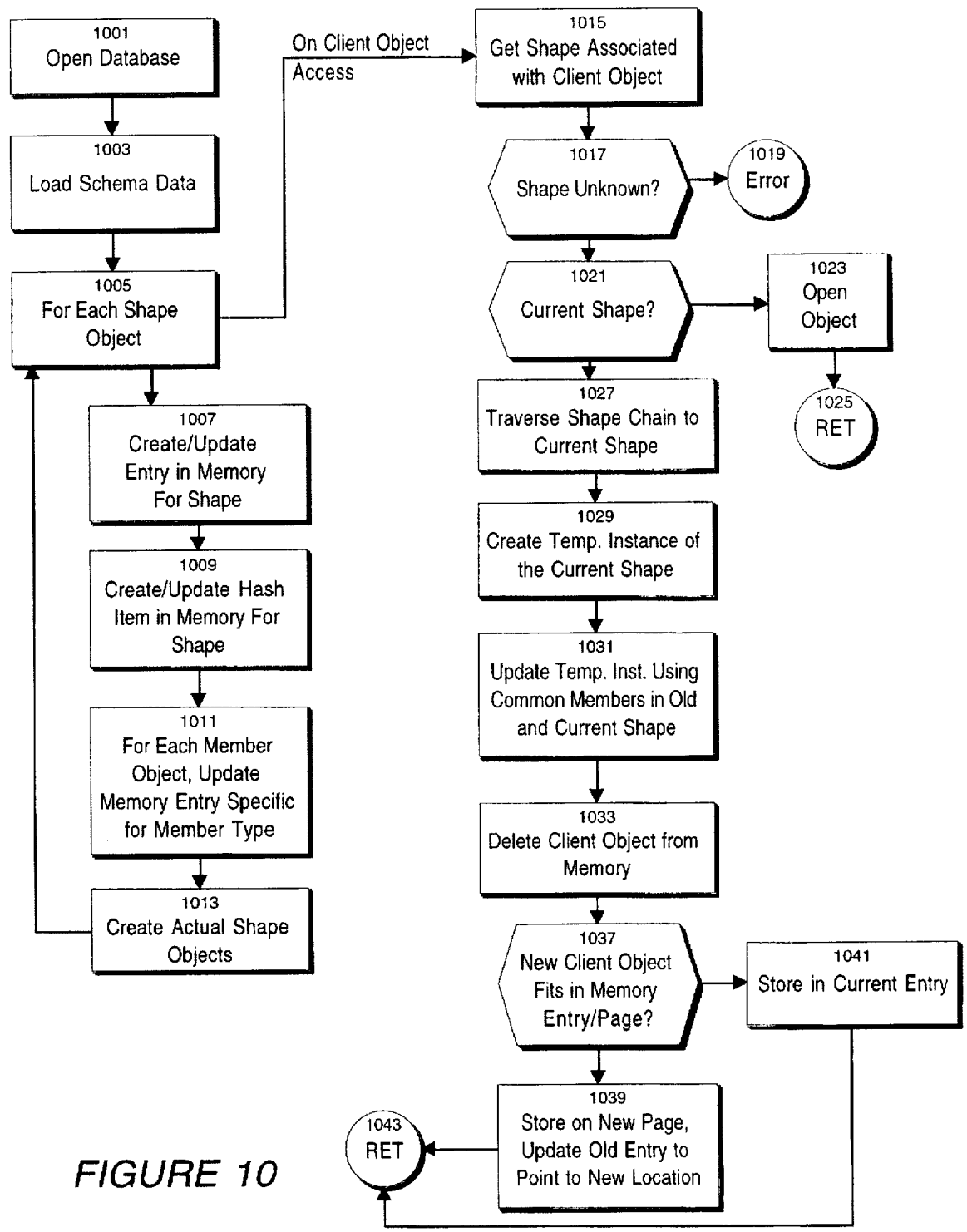
FIG. 10 is a flowchart of one embodiment of a process for deferred propagation of the evolved schema definitions to existing client objects.

Referring to FIG. 10, there is shown one embodiment of a deferred update process, including the memory management aspects thereof. The database 308 is opened 1001 in a desired access mode (read/write). The database 308 is preferably identified in a boot file specified by the user for use with the DBMS 304. The schema is loaded 1003 by the object manager 313 which opens each the shape objects 200 in the shape chain 210 of each domain class. In the preferred embodiment, a schema container object is used to maintain each shape chain 210. For each shape object 200 in the schema container, the object manager 313 performs the following functions.

The object manager 313 creates 1007 an entry in the memory 303 for the shape object 200, called the current shape. However, if there already exists a stub for it, then the stub is filled, and a new entry is not created. Also, the object manager 313 sets the deleted flag along with the class number of the shape in the entry.

The object manager 313 then creates 1009 a hash item, identifying the shape object 200 memory entry for a given shape number. If the shape object 200 is the most recent shape object 200, the object manager 313 creates another hash item returning the most recent shape object 200 given a class number, using the number scope object 140. If the shape object 200 has a previous shape object 200 associated with it, the object manager 313 reads the previous shape number. If the previous shape object 200 has already been loaded, the object manager 313 links the memory entry of the previous shape object 200 with that of the current shape object 200.

The object manager 313 then reads 1009 the members objects 102 of the shape object 200, and for each member object, updates 1011 the memory entry for the shape relative to the specific type of the member object 102. For primitive types, integer, unsigned integer, float, double, and the like, the entry includes the member ID, type, and relative position. Relative position is the order in which data members are located within an object. For an embedded data member, the entry includes the member ID, its relative position, and a pointer to the memory entry of the referenced shape object 200. If the referenced shape object 200 has not been read, then the object manager 313 creates a stub for it. For a base class, the member entry includes a pointer to its referenced shape object 200, a member ID, and its relative position. For an association object type, the object manager 313 loads the association information, including an association number, member ID, its referenced class number, its arity, and a flag indicating if the association is unidirectional. The object manager 313 also adds a hash item in an association structure which returns a pointer to the association structure given its number, preferably using the number scope object 140. If the association is an in-line one, which is stored in the object, its relative position and a flag indicating if its related object(s) is stored in the same container.

The object manager 313 then creates 1013 the actual shape objects 200. The creation of a persistent shape object 200 results in storing the most recent shape number of its class in place of the virtual pointer table. When an object is opened, this information is stored as part of the handle of the object. If the user tries to create an object of a deleted class, an error is then reported. At this point the DBMS 304 is ready to convert client objects 230 in the database 308 as they are accessed.

One mechanism for the deferred conversion of the client object 230 is as follows. The deferred conversion occurs on an event driven basis when a client object 230 is accessed. As described above, when a client object 230 is created, the client object 230 will include the shape number of the shape object 200 from which it is created. This number is kept in place of the virtual table (VTBL) pointer in a closed object. A closed object is one that is not active but that is persistent. All persistent objects inherit from a more general object class which requires a VTBL pointer. The DDL 309 also creates a dummy object of each object type, as defined by the current shape object 200 of the class. The dummy object for each class will have the correct schema and VTBL pointer. The dummy object of a class is used as the template into which old client objects 230 of the class are updated.

When the user accesses the client object 230, typically from the transaction processor 312, the shape object associated with the client object 230 is obtained 1015. This may be obtained from either the name scope object 130 or the number scope object 140, using the shape number held by the client object 230. If the user tries to open 1017 a client object 230 corresponding to an unknown shape number (side effect of another user update the schema), the object manager 313 returns 1019 an error.

If the shape object 200 associated with the client object 230 is the current shape object 200, then the object manager 313 opens client object 230 and returns 1025 successfully.

If the shape object 200 associated with the client object 230 is not the current shape object 200, the object manager 313 obtains 1027 the current shape object 200, for example by traversing the shape chain 210, and uses it to update the client object 230.

Figure 11A:
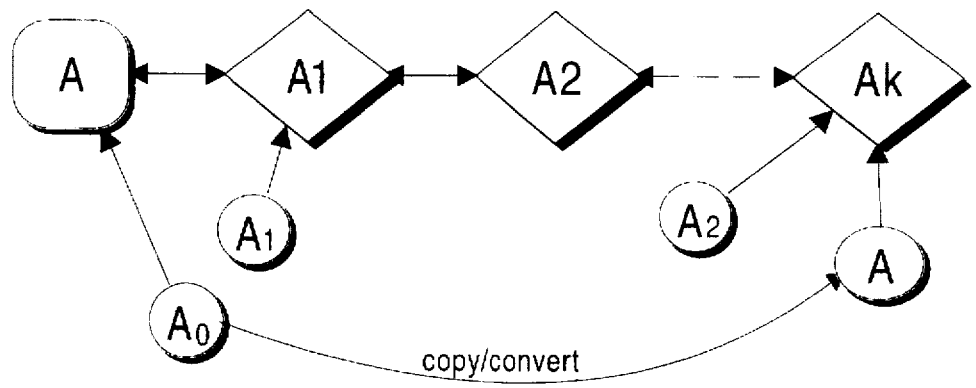
FIGS. 11a and 11b are illustrations of the portion of the schema of FIG. 1 during and following conversion of a selected client object.

First, the object manager 313 creates 1029 an instance of the current shape object 200, preferably using the temporary dummy object derived from the current shape. For each member that is in both the current shape 200 and the old client object 230, that is, where the member object 102 of the current shape and the member object 102 of the existing client object 230 have the same member ID, the object manager 313 updates 1031 the member object 102 of the temporary object. Particularly, if the member object 102 is of the same type, the object manager 313 copies the data from the existing member object 102 to the new member object 102. If the member object 102 is of a different type, the object manager 313 converts the old type to the new type. FIG. 11a illustrates the domain class of class object A, where client object $A_O$ has been accessed, and is being updated to the instance of the current shape $A_k$, which is initially a temporary dummy object, the data members of client object $A_O$ being copied or converted to the new schema of shape $A_k$.

The object manager 313 then deletes 1033 the existing client object 230 from the memory 303 if the existing object is currently maintained there.

Figure 11B:
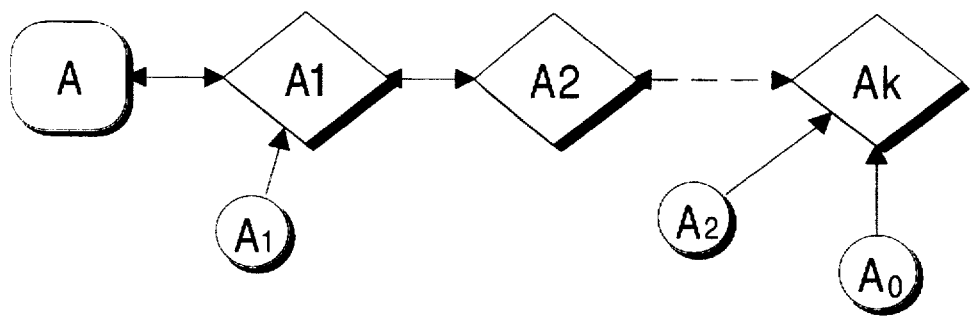

Finally, the object manager 313 determines 1037 whether the client object 230 following the conversion, can be stored in its old entry on its page or another slot on the same page. If not, then the object manager 313 stores 1039 the client object 230 on a nearby page, and stores its new address in its old entry, thereby allowing the client object 230 to be accessed transparently. Otherwise, the object manager 313 stores 1041 the client object 230 to the existing memory entry and page. The object manager 313 also sets the VTBL pointer in the client object 230. In either case, the object manager 313 then returns 1043. FIG. 11b illustrates the completion of the deferred propagation, with the replacement of the updated client object $A_O$ for the old client object $A_O$, and the deletion of the old client object.

Finally, there are occasions where an existing client object 230 in the database 308 is to be deleted. The deletion of a client object 230 takes place only when there is an attempt to open a client object 230 for which its most recent shape is marked as deleted. A scan operation for objects in the database 308 will access client objects 230 of a specified type. If the class of the client object 230 is within the scope of the search, the client object 230 is returned and subsequently opened. If the class of the client object 230 is marked for deletion, the client object 230 is deleted without conversion using the most recent shape object 200 for the domain class.

Where the member types of the existing member of the client object 230 and the current shape object 200 are different non-primitive types, updating 1031 of the client object 230 involves creating a specific conversion object that converts between different non-primitive types. In one embodiment, a copy conversion object takes as inputs a source member identifier, a target member identifier, and a length value. The copy conversion object then copies from the source member to the target member. In another embodiment, the copy conversion object uses the physical offset within the client object 230 to the source/target member object 102. This process provides for faster conversion since no deferencing of the member identifier is required.

We claim:

1. A schema, embodied in a computer readable medium and defining at least one class of objects in a database, the schema comprising:

at least one class object providing a first definition of a class;

for at least one class object, a shape chain comprising at least one shape object associated with the class object in an ordered series, each shape object providing a subsequent definition of the class object at a selected time, and at least one shape object in the shape chain being a current shape object for the class; and for at least one class object, at least one client object instantiated from the class object or from the shape object that was the current shape object at the time the client object was instantiated.

2. The schema of the claim 1, further comprising:

a base class object representing a base class, the base class object associated with a first shape chain including first shape objects; and at least one derived class represented by a class object derived from the base class object and associated with a second shape chain including second shape objects, each second shape object referencing a first shape object that was the current first shape object at a time when the second shape object was instantiated, and the first shape object referencing the second shape object.

3. The schema of claim 1, further comprising:

an embedding class object representing an embedding class, the embedding class object associated with a first shape chain including first shape objects, and having at least one member object defining a member of the embedding class, the member object referencing a second class object being an embedded class object; and the embedded class object associated with a second shape chain including second shape objects, each second shape object referencing a first shape object that was the current first shape object at a time when the second shape object was instantiated, the first shape object referencing the second shape object.

4. The schema of claim 1, wherein the ordered series of shape objects in a shape chain comprises a doubly linked list of shape objects terminating with a current shape object.

5. The schema of claim 1, further comprising:

for at least one class object, at least one member object defining a member of the class, the class object having references to the member objects, and each member object having a reference to the class object; and wherein for each shape object in the shape chain of the class object, the shape object references to the member objects of the class, and maintains for selected member objects a flag indicating whether the member defined by the member object is deleted from the class.

6. The schema of claim 5, wherein each member object has a numerical member identifier unique within the class definition, and the class object and each shape object in the shape chain maintain the highest member identifier, such that for a new member added to the class definition, a new member object is instantiated and attached to the current shape object, the new member object having a member identifier incremented from the highest member identifier.

7. The schema of claim 1, wherein each class object has a reference to the current shape object in its shape chain.

8. The schema of claim 1, wherein each class object has a name corresponding to a name of the class, and a globally unique class identifier.

9. The schema of claim 8, included in an object oriented database system comprising a translation object that accepts a name of a class object and returns a reference to the current shape object in the shape chain of the class object.

10. The schema of claim 8, included in an object oriented database system comprising a translation object that accepts a class identifier of a class object and returns a reference to the current shape object in the shape chain of the class object.

11. The schema of claim 8, included in an object oriented database management system comprising:

a schema manager that receives a DDL input file including at least one class definition modifying an existing class in the database, and creates a new shape object in the shape chain of the class object defining the class, the new shape object becoming the current shape object in the shape chain, the schema manager:

associating with the new shape object, new member objects representing new members of the class; and indicating, for selected member objects associated with the new shape object and representing existing members of the class, that the member has been deleted from the class according to the class definition.

12. The schema manager of claim 11, further determining for each input member definition in a class definition in the input file, whether the input member definition is different from an existing member definition provided by an existing member object in the current shape object of the class, and responsive to a difference, determining whether the input member definition is consistent with the existing member definition.

13. The schema of claim 12, wherein:

each member object has a numerical member identifier unique within the class definition; and the schema manager, responsive to a consistent definition between an input member definition and an existing member definition provided by an existing member object, copies the member identifier of the existing member object to a new member object providing the input member definition.

14. The schema of claim 1 included in an object oriented database management system comprising:

an object manager accepting a request for a client object and determining whether the client object references the current shape object of the class from which the client object is instantiated, and responsive to the client object not referencing the current shape object, updating the definition of the client object to class definition provided by the current shape object.

15. A method of evolving a schema of a class in a database, the method comprising the steps of:

maintaining for the class a class object providing a first definition of the class;

maintaining in association with the class object a shape chain including at least one shape object in an ordered series, each shape object providing a subsequent definition of the class, the shape chain including a current shape object;

receiving an input data definition language file containing a modified definition of the class;

creating a new shape object for the class according to the modified definition of the class; and, appending the new shape object to the shape chain for the class, making the new shape object the current shape object.

16. The method of claim 15, further comprising:

instantiating a new client object of the class from the current shape object.

17. The method of claim 15, further comprising:

deferring updating of an existing client object instantiated from either the class object or any of the shape objects in the shape chain of the class object, excluding the current shape object, until the client object is accessed.

18. The method of claim 17, wherein deferring updating of an existing client object further comprises:

receiving a request for the client object; and determining whether the client object was instantiated from the current shape object of the class;

and where the client object is not instantiated from the current shape object:

retrieving an instance object of the current shape object;

updating the members of the instance object with the existing corresponding members of the client object according to a type of the members; and deleting the client object, the instance object becoming the client object.

19. The method of claim 18, wherein updating the members further comprises:

where the type of a member of the instance object is the same as the type of a corresponding member of the client object, copying the data of the member of the client object to the corresponding member of the instance object; and where the type of a member of the instance object is not the same as the type of a corresponding member of the client object, converting the data of the member of the client object to the type of corresponding member of the instance object.

20. The method of claim 19, where converting the data of the member of the client object comprises creating a conversion object that converts from the type of the member of the client object to the type of the member of the instance object.

21. A schema for an object oriented database, embodied in a computer readable medium and capable of maintaining a time sequenced plurality of class definitions for each of a plurality of classes, the schema comprising:

for each class, a class object representing the class, and maintaining a first definition of the class;

for each class, a time sequenced plurality of shape objects, each shape object maintaining a subsequent definition of the class, the plurality of shape objects including a current shape object maintaining a current definition of the class, at least one of the plurality of shape objects associated with the class object of the class, wherein each class object maintains a reference to the current shape object of the class, and each shape object maintains a reference to a previous shape object and a reference to a next shape object in the time sequenced plurality of shape objects; and each class object maintains a reference to at least one member object defining a member of the class, each member object having a member identifier unique within the class having the member, the class object maintaining the highest member identifier of its member objects, and each member object of the class having a reference to a shape object associated with the class object for the class.

22. The schema of claim 21, wherein:

each shape object of a class has a globally unique shape identifier;

each shape object maintains references to any parent shape object and to any child shape object; and each shape object maintains references to any shape objects of member objects that are defined by embedded classes, and to any shape objects of classes that embed the class associated with the shape object as a member.

* * * * *